(12) United States Patent
Peeters et al.

(10) Patent No.: US 7,699,289 B2
(45) Date of Patent: Apr. 20, 2010

(54) THROTTLE VALVE FOR WEAVING LOOMS

(75) Inventors: Jozef Peeters, Ypres (BE); Jean Marie Bamelis, Ypres (BE)

(73) Assignee: Picanol N.V., Ypres (BE)

( * ) Notice: Subject to any disclaimer, the term of this patent is extended or adjusted under 35 U.S.C. 154(b) by 158 days.

(21) Appl. No.: 11/793,819

(22) PCT Filed: Dec. 24, 2004

(86) PCT No.: PCT/EP2004/014818

§ 371 (c)(1),
(2), (4) Date: Jun. 22, 2007

(87) PCT Pub. No.: WO2006/066616

PCT Pub. Date: Jun. 29, 2006

(65) Prior Publication Data

US 2008/0105325 A1 May 8, 2008

(51) Int. Cl.
*F16K 5/12* (2006.01)
(52) U.S. Cl. ............... 251/129.11; 251/129.22; 251/207; 251/209
(58) Field of Classification Search .......... 251/206, 251/207, 208, 209, 129.22, 129.11, 129.04; 137/884
See application file for complete search history.

(56) References Cited

U.S. PATENT DOCUMENTS 3,558,100 A * 1/1971 Hulsey .................. 251/207
3,672,406 A 6/1972 Vermeulen 4,177,834 A * 12/1979 Bonney ................. 251/283

(Continued)

FOREIGN PATENT DOCUMENTS

FR 1 596 693 A 6/1970

(Continued)

OTHER PUBLICATIONS

Examination Report of European Patent Office regarding European Patent Application No. 04804403.6, Dec. 23, 2009.

*Primary Examiner*—John Bastianelli
(74) *Attorney, Agent, or Firm*—Bacon & Thomas, PLLC.

(57) ABSTRACT

A valve (13*a*) is described comprising: a housing (50) having a fluid inlet for (54) receiving a flow of compressed fluid and a fluid outlet (55); a flow duct (60) movably mounted with respect to the housing, the duct (62) having a fluid inlet (62) for receiving a flow of compressed fluid and a fluid outlet (65), the fluid outlet being positioned around at least a part of the circumference of the duct and being dimensioned to provide a different flow rate at different sections or positions around the circumference of the duct; the fluid outlet of the housing being alignable with a portion of the fluid outlet of the duct to provide a flow rate related to the relative position of the portion of the fluid outlet of the duct and the fluid outlet of the housing; and, a drive element (70) for moving, e.g. rotating, the duct with respect to the housing such that a desired portion of the fluid outlet of the duct aligns with the fluid outlet of the housing. The valve may operate as a so-called throttle valve. It is an advantage that the valve is quickly movable into a desired relative position in order to regulate fluid flow through the valve. The valve is designed to have a long operational lifetime as, even if the outer surface of the duct wears, the outlet will not substantially change in size and the throttling effect will remain substantially the same.

14 Claims, 6 Drawing Sheets

U.S. PATENT DOCUMENTS

| | | | |
|---|---|---|---|
| 4,402,344 A * | 9/1983 | Kemmner | 251/129.22 |
| 4,534,387 A | 8/1985 | Van Hest | |
| 4,930,401 A * | 6/1990 | Cameron et al. | 137/884 |
| 5,242,150 A * | 9/1993 | Shiffler et al. | 251/209 |
| 5,544,856 A * | 8/1996 | King et al. | 251/205 |
| 5,566,921 A * | 10/1996 | Yokota et al. | 251/129.22 |
| 5,855,228 A * | 1/1999 | Perach | 251/129.22 |
| 5,992,463 A * | 11/1999 | Redemann et al. | 137/884 |
| 6,036,107 A * | 3/2000 | Aspen et al. | 251/148 |
| 6,062,273 A | 5/2000 | Peeters et al. | |
| 6,076,803 A * | 6/2000 | Johnson et al. | 251/129.22 |
| 6,843,466 B1 * | 1/2005 | Chuang | 251/207 |
| 2003/0052292 A1 * | 3/2003 | Tranovich et al. | 251/209 |

FOREIGN PATENT DOCUMENTS

| | | |
|---|---|---|
| FR | 2 220 031 A | 9/1974 |
| FR | 73.07546 | 9/1974 |

\* cited by examiner

THROTTLE VALVE FOR WEAVING LOOMS

FIELD OF THE INVENTION

The present invention relates to a valve especially a throttle valve, as well as to a method of operating the valve, a method of manufacturing the valve and to use of the valve in the field of weaving, e.g. in jet weaving. The present invention also relates to a weaving loom comprising the valve and a method of weaving using the valve.

BACKGROUND TO THE INVENTION

In an air jet weaving system, compressed air is used to draw weft threads from supply spools and to blow them into the shed of an air jet loom. A set of relay nozzles is used to support the movement of the weft thread across the shed, which may be several meters in width. Additional nozzles at the far end of the shed may stretch an inserted thread during a weaving operation. An example air jet loom is described in U.S. Pat. No. 4,534,387.

It is known to adjust the airflow to the main or to the relay nozzles according to the kind of weft thread to be woven. For example, a smooth and strong filament yarn can be woven with a high airflow at the relay nozzles while a weak spun yarn, or a spun yarn with several irregularities, can be woven only with a lower airflow at the relay nozzles. In order to successively insert two or more kinds of weft threads, the airflow of the relay nozzles can be set at a value required by the weakest type of weft yarn so that the weft yarn is not blown apart, broken or damaged.

U.S. Pat. No. 4,534,387 provides two airflow rates for the relay nozzles and selects the correct airflow such that a yarn will not be blown apart and such that the yarn will be inserted across the shed to arrive timely at the other side or far end of the shed. The weaving machine speed is adapted to suit to the slowest yarn. This machine requires a separate pressure-reducing valve for each required airflow rate.

U.S. Pat. No. 6,062,273 describes an electrically actuated throttle valve for an insertion nozzle. The throttle valve comprises a plunger which is movable, in a linear direction, within a bore hole. The plunger can be positioned at a desired distance from a valve seat. This type of valve is relatively slow to operate. In situations where the airflow rate needs to be varied for each insertion, the valve has to operate in a period of less than 35 msec. A second problem with this type of valve is that it has a rubber sealing ring which surrounds the plunger to prevent compressed air from escaping from the valve. This sealing ring is prone to wear and thus this type of valve has a limited life time when used in situations where the airflow rate needs to be varied for each insertion.

It is desirable to have a reduced number of valves as these valves are expensive and are volume/area consuming items. It is also desirable to provide a valve which has a long life time and which does not wear so rapidly. Further, it is also desirable to have a rapidly operating valve.

SUMMARY OF THE INVENTION

The present invention seeks to provide an improved valve as well as a method of operating the valve, a method of manufacturing the valve, use of the valve in the field of weaving, e.g. in jet weaving, a weaving loom comprising the valve and a method of weaving using the valve. An advantage of the present invention is rapid speed of operation allowing airflow rate to be varied for each insertion and even during an insertion of a weft thread in a weaving loom.

A first aspect of the present invention provides a valve comprising:

a housing having a fluid inlet for receiving a flow of compressed fluid and a fluid outlet;

a flow duct movably mounted with respect to the housing, the duct having a fluid inlet for receiving a flow of compressed fluid and a fluid outlet, the fluid outlet being positioned around at least a part of the circumference of the duct and being dimensioned to provide a different flow rate at different sections or positions around the circumference of the duct;

the fluid outlet of the housing being alignable with a portion of the fluid outlet of the duct to provide a flow rate related to the relative position of the portion of the fluid outlet of the duct and the fluid outlet of the housing; and, a drive element for moving the duct with respect to the housing such that a desired portion of the fluid outlet of the duct aligns with the fluid outlet of the housing. The valve may operate as a so-called throttle valve.

A valve of this kind has an advantage of being quickly movable into a desired relative position in order to regulate fluid flow through the valve. The duct can be formed with a thin tubular wall which makes the duct lightweight and with low inertia. A valve having a tubular duct having a fluid outlet allowing a different fluid flow around the circumference of the duct allows to dimension the outlet of the duct in a simple manner to provide a different fluid flow rate through the valve. The rapid speed of operation allows a fluid flow rate to be varied at each insertion and even during the insertion of a weft thread. The valve is designed to have a long operational lifetime as, even if the outer surface of the duct wears, the outlet will not substantially change in size and the throttling effect will remain substantially the same.

It is preferred that the valve comprises a flow duct mounted rotatably with respect to the housing and a drive element for rotating the duct with respect to the housing. The duct of such a valve only needs to be rotated by a small angular distance, which can be achieved rapidly and reliably. Such a movement can normally be done more quickly than a movement in a valve which operates by linear movement along a borehole.

It is preferred that the valve is not provided with a seal with moving parts which could wear and become unreliable. Particularly, there is no seal provided with respect to the flow duct. The valve can have a means for impeding fluid flow by an amount determined by the position of the fluid outlet of a duct. To this end or in applications where an on-off function is required, a shut-off valve can be positioned downstream of the throttle valve.

It is preferred that the drive element, such as a motor and coupling device, is positioned within the flow path through the valve. This has an advantage of avoiding the need for a seal between a moving valve element and the housing to prevent fluid escaping from the housing. It also has an advantage of cooling the drive element.

Preferably, the drive means, such as a motor, has a drive shaft which is mounted coaxially with the longitudinal axis of the duct.

The fluid inlet of the duct can be located in an end face of the duct. More particularly, the inlet may be positioned around the circumference of the duct at a position spaced along the duct from the fluid outlet and can take the form of a set of apertures, e.g. holes or slots in the wall of the duct. This allows the drive element to connect to the end face of the duct and to use a duct with a small the diameter, which further reduces the weight of the duct and its moment of inertia. This improves the ability to quickly move into a desired angular position.

The fluid outlet of the duct can comprise a slot around a part of the circumference of the duct or a set of holes, with the size of individual holes and/or the density of holes in the set differing around the circumference of the duct.

In order that the outlet of the duct can maintain a simple fitting to the fluid outlet of the housing through a range of angular positions, it is preferred that both the flow duct and the part of the housing in the region of the fluid outlet are cylindrical. The remainder of the duct can be of a different shape although, for ease of manufacture and cost, it is preferred that the entire duct is substantially cylindrical.

The invention has a particularly advantageous application in the field of air jet weaving but the invention is not limited to this application.

The use of valves according to the invention in an airjet loom also allows use of one air tank for all the relay nozzles and also for the main nozzles. Of course a limited number of air tanks may still be used that can supply air at a given pressure to a respective relay or to a respective main nozzle via a valve according to the invention.

Further aspects of the invention provide a controller for controlling operation of a valve according to the invention. The control functionality described here can be implemented in software, hardware or a combination of these. Accordingly, another aspect of the invention provides software for controlling operation of the valve. The software may be stored on an electronic memory device, hard disk, optical disk or other machine-readable storage medium. The software may be delivered as a computer program product on a machine-readable carrier or it may be downloaded directly to the controller via a network. Further aspects of the invention include a manufacturing method for such a valve, a weaving loom comprising such a valve and a method of operating such a valve.

A further aspect of the invention provides a valve assembly comprising:

a housing having a fluid inlet for receiving a flow of compressed fluid, a fluid outlet and a flow path joining the inlet and the outlet;

a valve member comprising a tubular flow duct movably mounted within the flow path which is operable to regulate flow along the flow path by positioning the fluid outlet of the duct, more particularly by aligning a portion of the fluid outlet, with respect to the outlet of the housing; and, a drive element for operating the valve member, the drive element being mounted in the flow path.

BRIEF DESCRIPTION OF THE DRAWINGS

Embodiments of the invention will be described with reference to the accompanying drawings in which.

DESCRIPTION OF PREFERRED EMBODIMENTS

Figure 1:
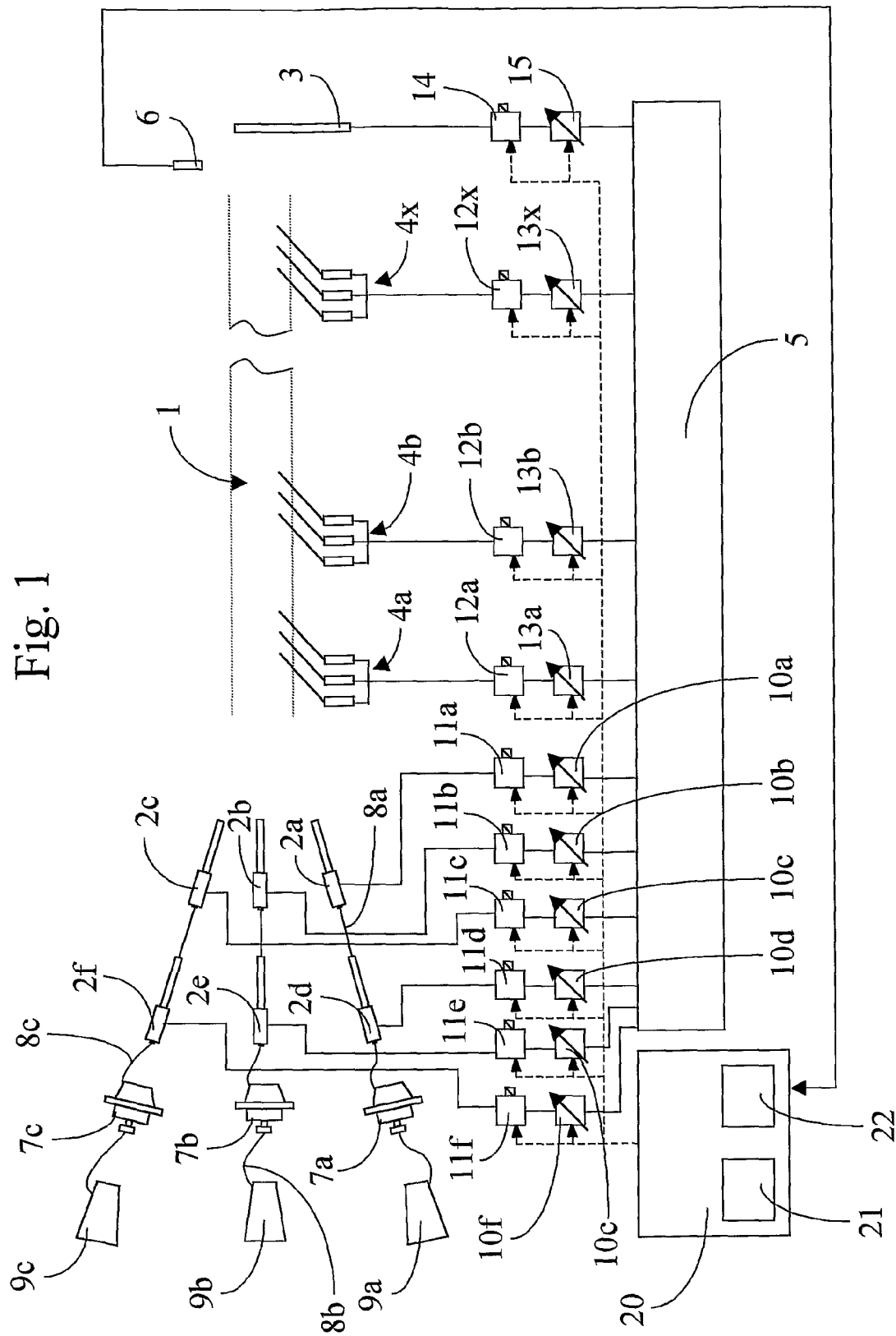
FIG. 1 schematically shows a jet weaving machine in which the invention can be used.

The present invention will be described with respect to particular embodiments and with reference to certain drawings but the invention is not limited thereto but the invention is only limited by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The present invention will mainly be described with reference to the use of a throttle valve in a weaving loom. Other applications of such a valve are in textile machines whereby a different fluid flow through the valve is required to provide a different fluid flow through a nozzle or similar device of the textile machine. In addition, the term "throttle valve" should not be interpreted as including any limitations other than those in the attached claims.

FIG. 1 shows an overall schematic view of a weft insertion system of an air jet weaving loom. Three main jet nozzles 2a, 2b, 2c and three additional main jet nozzles 2d, 2e, 2f are shown. Each main nozzle 2a, 2b, 2c, 2d, 2e, 2f is supplied with air from a reservoir 5 via an adjustable throttle valve 11a, 11b, 11c, 11d, 11e, 11f and a shut-off valve 10a, 10b, 10c, 10d, 10e, 10f which are described more fully below. The reservoir 5 comprises pressurised air at a given pressure. A weft preparation device 7a, 7b, 7c draws off a weft thread 8a, 8b, 8c from a corresponding yarn supply spool 9a, 9b, 9c. Each supply spool 9a, 9b, 9c may be provided with a different kind of weft thread, e.g. weft threads having different properties, such as e.g colour or thickness. The weft preparation device 7a, 7b, 7c stores the weft thread 8a, 8b, 8c on a winding drum and releases the required length of the weft thread 8a, 8b, 8c at the proper moment in the weaving cycle to be inserted into the shed 1 by means of the associated jet nozzles 2a, 2d, the associated jet nozzles 2b, 2e or the associated jet nozzles 2d, 2f. The shed 1 is formed in a known manner between two planes of warp threads. The weft threads 8a, 8b, 8c may be inserted in the warp shed 1 according to a predefined sequence which is programmed in controller 20. Several sets of relay nozzles 4a, 4b, . . . , 4x are positioned across the shed 1, and serve to carry a weft thread 8a, 8b, 8c across the shed 1. The relay nozzles 4a, 4b, . . . , 4x are supplied with air from reservoir 5 via a further throttle valve 13a, 13b, . . . , 13x and shut-off valve 12a, 12b, . . . , 12x. At the far end of the shed 1 there is a so-called stretching nozzle 3 which serves to stretch an inserted weft thread 8a, 8b, 8c. This nozzle 3 is also supplied with air from reservoir 5 via a further throttle valve 15 and shut-off valve 14. Controller 20 operates the throttle valves 11a, 11b, 11c, 11d, 11e, 11f, 13a, 13b, . . . , 13x, 15 and shut-off valves 10a, 10b, 10c, 10d, 10e, 10f, 12a, 12b, . . . , 12x, 14 to provide a required air flow rate at each moment in the weaving cycle during the weaving operation. For a desired weaving pattern, controller 20 has a set of instructions which determine, amongst others, the required weft threads 8a, 8b, 8c, airflow rates for the nozzles, and also valve settings and timings for the throttle valves 11a, 11b, 11c, 11d, 11e, 11f, 13a, 13b, . . . , 13x, 15 and the shut-off valves 10a, 10b, 10c, 10d, 10e, 10f, 12a, 12b, . . . , 12x, 14. Further a weft thread detector 6 is provided at the far end of the shed 1 in order to determine the arrival of the weft thread 8a, 8b, 8c.

Figure 2:
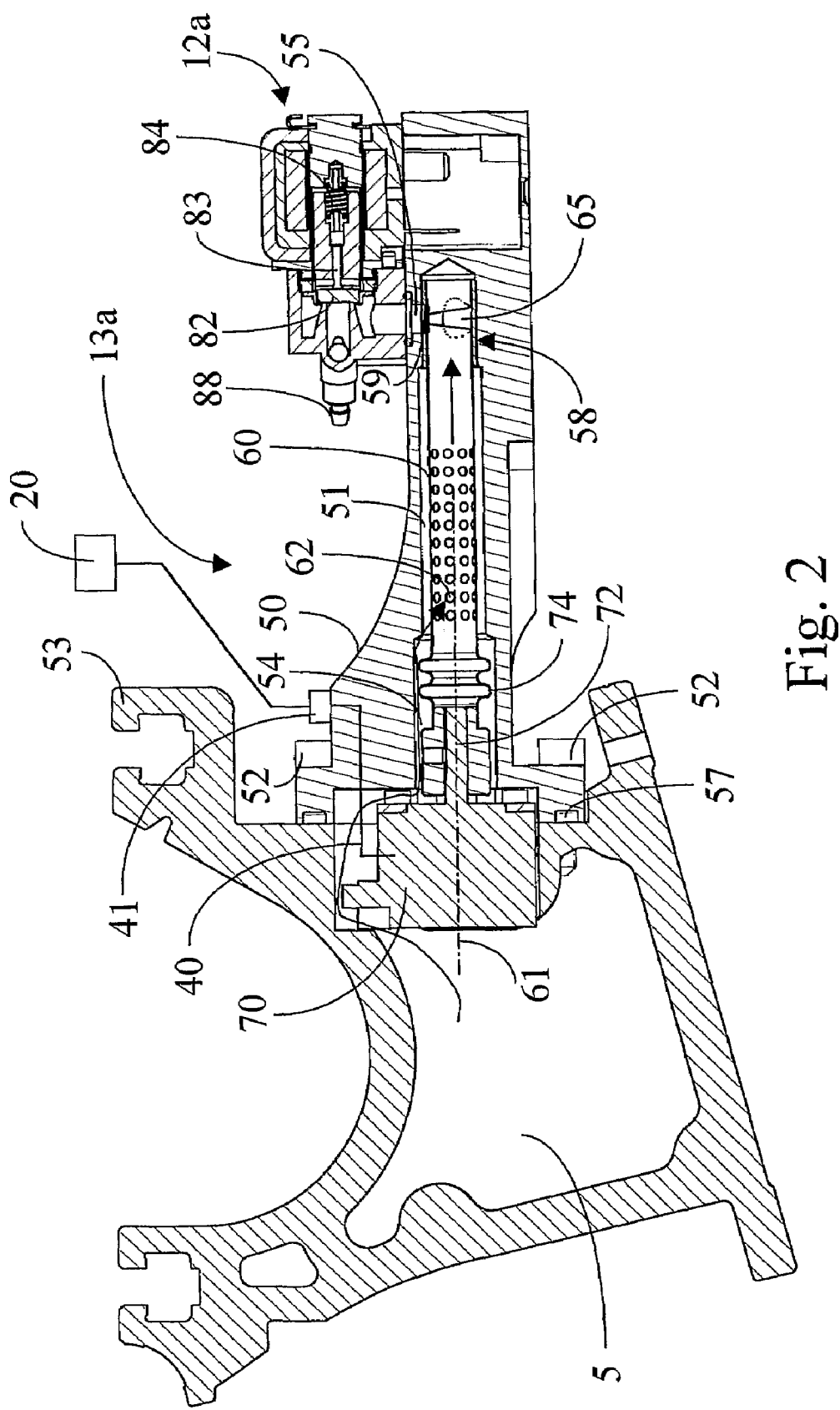
FIG. 2 shows a first embodiment of a throttle valve for use in the machine of FIG. 1.

FIG. 2 shows a first embodiment of the throttle valve 13a according to the present invention and shut-off valve 12a in more detail. The throttle valve 13a comprises a housing 50 which connects, in a fluid-tight manner, to an air reservoir 5. The housing 50 comprises a fluid inlet 54 for receiving a flow of compressed air and a fluid outlet 55. The fluid-tight seal is provided by bolts 52 and a sealing ring 57. Housing 50 has a channel 51, e.g. a bore hole in which a tubular duct 60 is mounted. In this embodiment, duct 60 comprises a thin-walled tube which is cylindrical along its entire length, although other shapes are possible. In a preferred embodiment the tube is formed of metal with a wall thickness of about 0.2 mm or more particularly with a wall thickness less than 1 mm. A drive element, more particularly a motor 70 is mounted between the air reservoir 5 and channel 51 of the housing 50. A drive shaft 72 extends from the motor 70 and the drive shaft 72 is connected, via a coupling device 74, to the upstream end of the duct 60. The drive shaft 72 is aligned with the longitudinal axis 61 of the duct 60. Duct 60 is supported at the upstream end by the drive shaft 72 and coupling device 74, and at the downstream end by a sleeve or bearing 58 which fits between the duct 60 and housing 50. The bearing 58 is formed as a tubular element that is fixed, e.g. glued, into the channel 51 of the housing 50. The housing 50 has a fluid outlet 55 near the upper face of the housing 50, e.g. a circular bore hole or a slot-like opening. The fluid outlet 55 comprises an opening in the bearing 58 which is situated in the prolongation of an opening 55 in the housing 50. The air reservoir 5 can be connected in a known manner to an air supply line (not shown). The housing 50 can be mounted to the frame 53 at a place adjacent to an associated nozzle of the loom.

Duct 60 has a set of inlet holes 62 at its upstream end. Each of the holes 62 extends from the outer surface of the wall of the duct 60 to the hollow interior of the duct 60. In this embodiment the holes 62 are located around the entire circumference of the duct, along a band which is almost 50% of the total length of the duct 60. The number of holes 62 is chosen so as to permit, in use, a good flow of air into the interior of the flow duct 60, while maintaining sufficient strength of the duct 60 to withstand air pressure and rapid movement of the duct 60. At the downstream end of the duct 60, a V-shaped slot 65 is defined in the duct 60. The slot 65 extends from the outer surface of the wall of the duct 60 through to the hollow interior. The slot 65 extends partially around the circumference of the duct 60. Clearly, the circumferential length of the slot 65 is limited to a part of the circumference of the duct 60, otherwise it would dissect the duct 60. The V-shaped slot 65 aligns with the outlet 55 of the housing 50. The outlet 55 is dimensioned such that it overlaps only a portion of the slot 65. As noted above, duct 60 is rotatable about longitudinal axis 61. In use, motor 70 turns drive shaft 72, and thus tube 60, into a particular angular position. The position of the slot 65 with respect to the outlet 55 defines what part or portion of the slot 65 is aligned with the outlet 55 and thus regulates how much air can flow from the air reservoir 5, through the duct 60 and through the outlet 55. In this way it may be possible to regulate the air flow through the outlet 55 between almost no air flow and maximum air flow, e.g. creating a flow through opening from the duct 60 to the opening 55 between 0% or 100% of the opening of the outlet 55. Of course, according to a variant the flow through opening may also be between for example 20% and 100% of the opening of the outlet 55. The duct 60 is shaped or dimensioned to provide a different flow rate at different sections around the circumference of the duct 60, e.g. by the shape of the slot 65 around the circumference of the duct 60.

A shut-off valve 12a (shown schematically) is mounted downstream of the throttle valve 13a. A plunger 83 and valve member 82 act on a valve seat and are normally biased into a closed position (as shown) by a spring 84. The valve member 82 can be moved, e.g. electromagnetically, against the bias of spring 84 into an open position to allow air to flow from the outlet 55 to the outlet 88. Outlet 88 connects to a main nozzle or to a relay nozzle as shown in FIG. 1.

Figure 3:
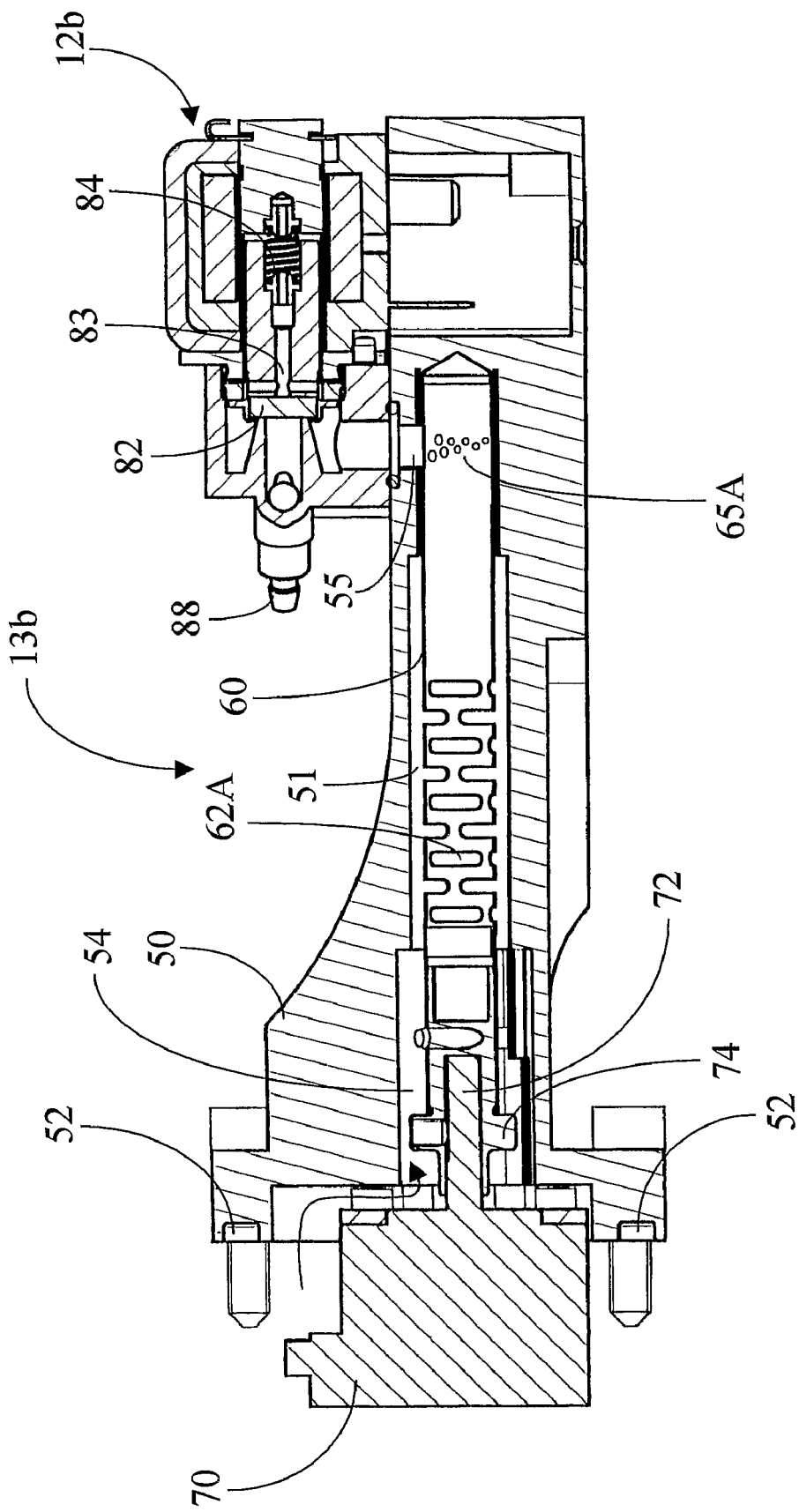
FIG. 3 shows a second embodiment of a throttle valve for use in the machine of FIG. 1.
Figure 4:
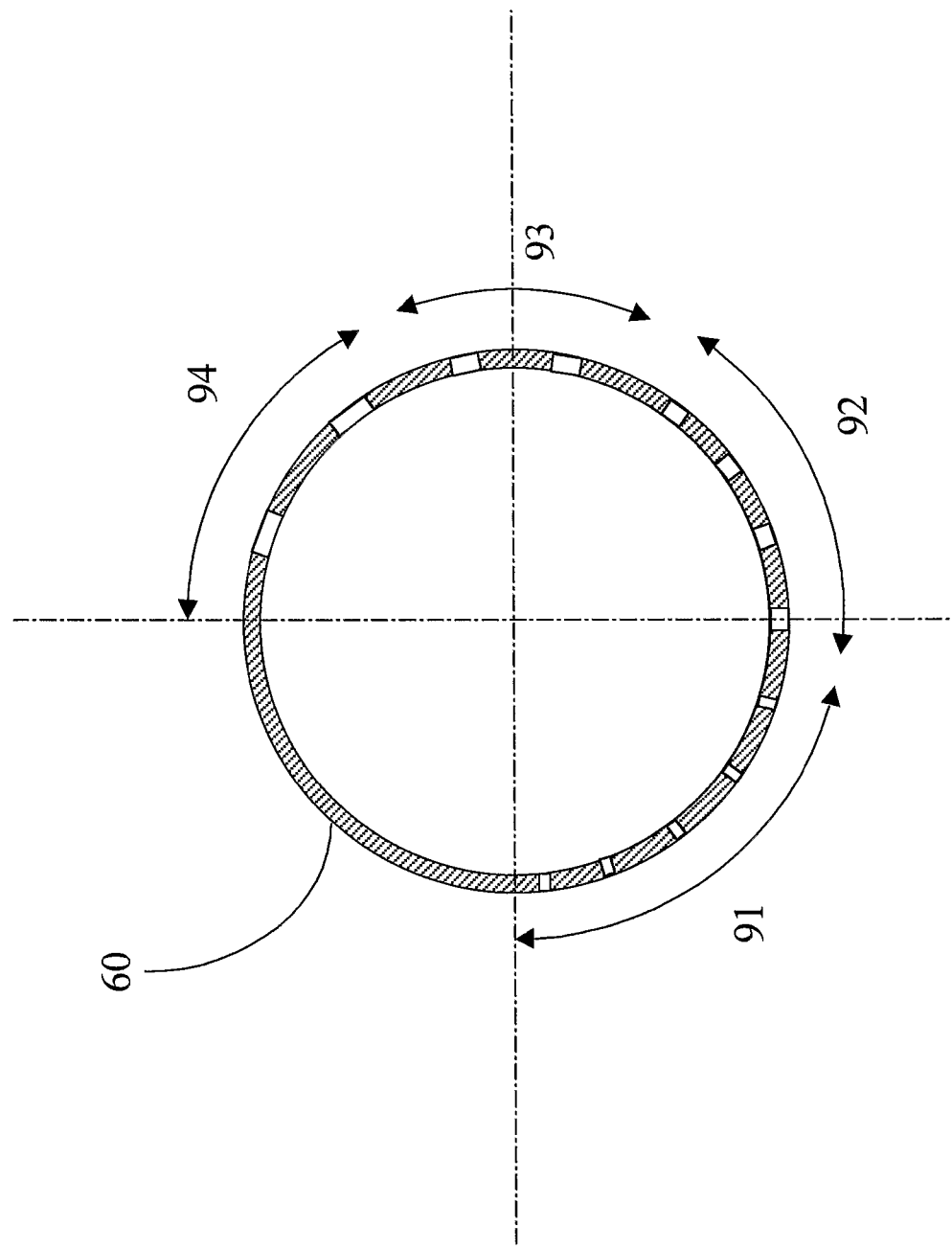
FIG. 4 shows a cross-section of a variant of a duct as in FIG. 3 near its outlet.
Figure 5:
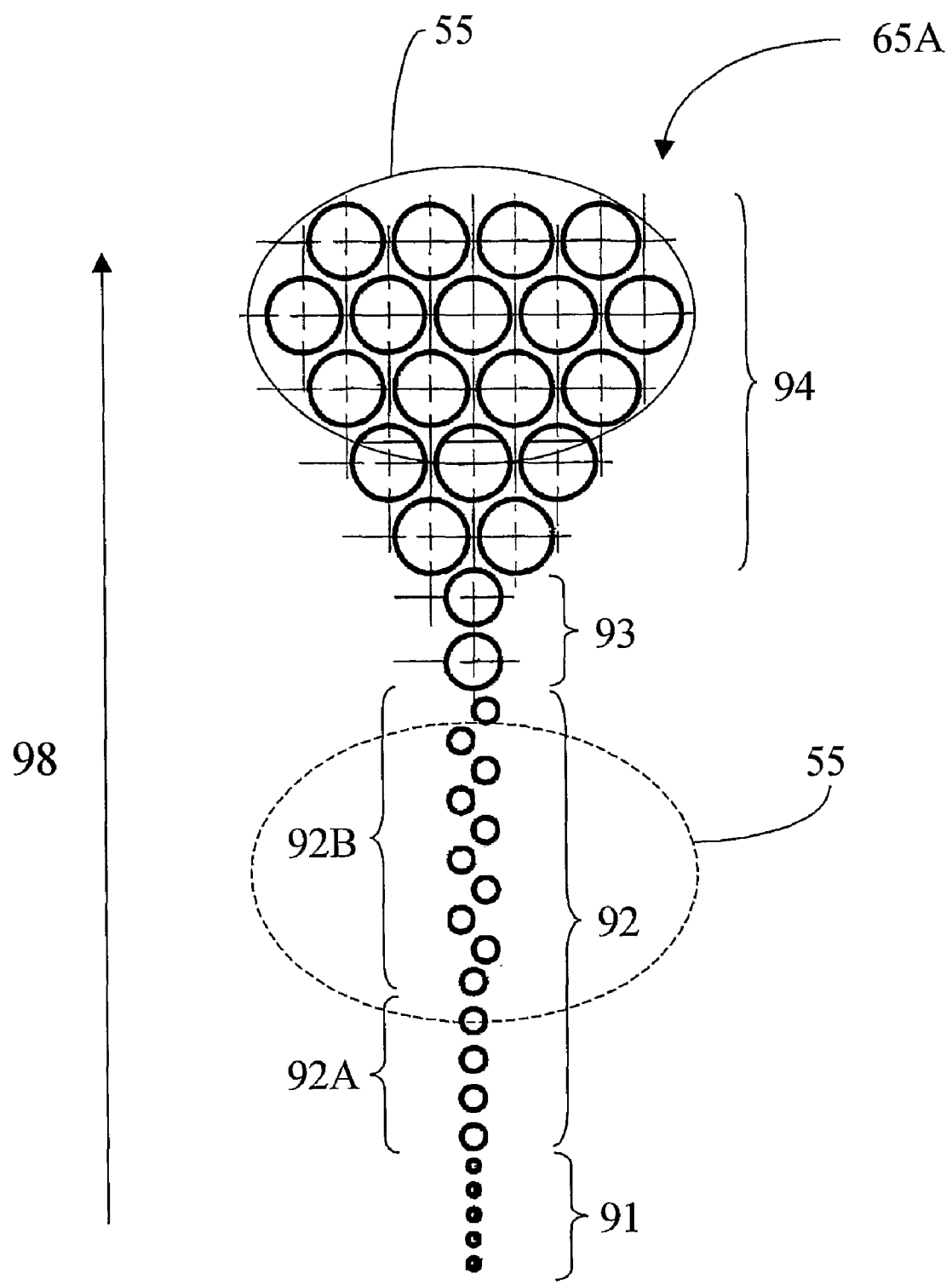
FIG. 5 shows the outlet of the valve shown in FIG. 3 in more detail.

FIGS. 3-5 show a second embodiment of the throttle valve 13b and shut-off valve 12b. The main differences are in the design of the inlet and outlet of the duct 60. In this embodiment the inlet comprises a series of slots 62A. As shown more fully in FIG. 3, adjacent rings of slots 62A are offset from one another. For example, in this embodiment the housing 50 does not include a separate bearing element and the downstream end of the duct 60 is guided directly into the housing 50.

The outlet 65A of the duct 60 comprises a set of holes which form a band around part of the circumference of the duct 60. The set of holes 65A are arranged such that the achievable flow rate gradually increases at different sections around the circumference of the duct 60, thus allowing to achieve a different flow rate or flow through opening of the valve by rotating the duct 60 with respect to the outlet 55 of the housing 50, from one end of the outlet 65A to the other. FIGS. 4 and 5 each show a set of holes 65A in more detail. It will be appreciated that the pattern of FIG. 5, which is shown as a plan view, would be wrapped around the outer wall of the duct 60. At a first end of the outlet 65A of the duct 60, the holes have a small diameter. In this example a sub-set 91 have a small diameter (e.g. 0.25 mm). As one moves towards the second end of the outlet the diameter of each hole increases and the number of holes increases. A second sub-set of the holes has a larger diameter (e.g. 0.5 mm.) A sub-set 92A of the holes at this diameter are aligned in a linear manner while a second sub-set 92B of the holes at this diameter are staggered about a centre-line. This staggering increases the achievable flow compared to the linear alignment, while maintaining the strength of the duct 60. A third sub-set 93 of holes have a larger diameter (e.g. 1.1 mm) and a final sub-set 94 of holes have the largest diameter (e.g. 1.5 mm). In this final sub-set 94 the holes are arranged so that, as one moves in the direction 98 by rotating the duct 60, there is an increasing number of holes in each row that in use will be arranged in alignment with the outlet 55 of the housing 50. This modified form of outlet 65A of the duct 60 has an advantage in that it maintains the strength of the duct 60 better than a slot 65 and can be provided around a greater portion of the total circumference of the duct 60. Furthermore, the outlet 65 of the duct 60 can be manufactured precisely, more particularly the holes of the outlet 65A can be manufactured more precisely than the slot 65 in FIG. 2.

In FIG. 5 also possible positions of the outlet 55 of the housing 50 are shown with respect to the outlet 65A of the duct 60. As shown in full lines the outlet 55 of the housing 50 is arranged with respect to the holes of the outlet 65A of the duct 60 in such a way that the flow through the duct 60 and the outlet 55 of the housing 50 is almost 100% of the flow through a free outlet 55, while in the position shown in dashed lines the outlet 55 of the housing 50 is arranged in such a way that the flow through the duct 60 and the outlet 55 of the housing 50 is only a fraction of the flow through a free outlet 55.

Although FIGS. 2 and 3 show a different inlet and a different outlet, either of these modifications can be used independently of the other, e.g. combinations of embodiments of FIGS. 2 and 3 are possible.

Figure 6:
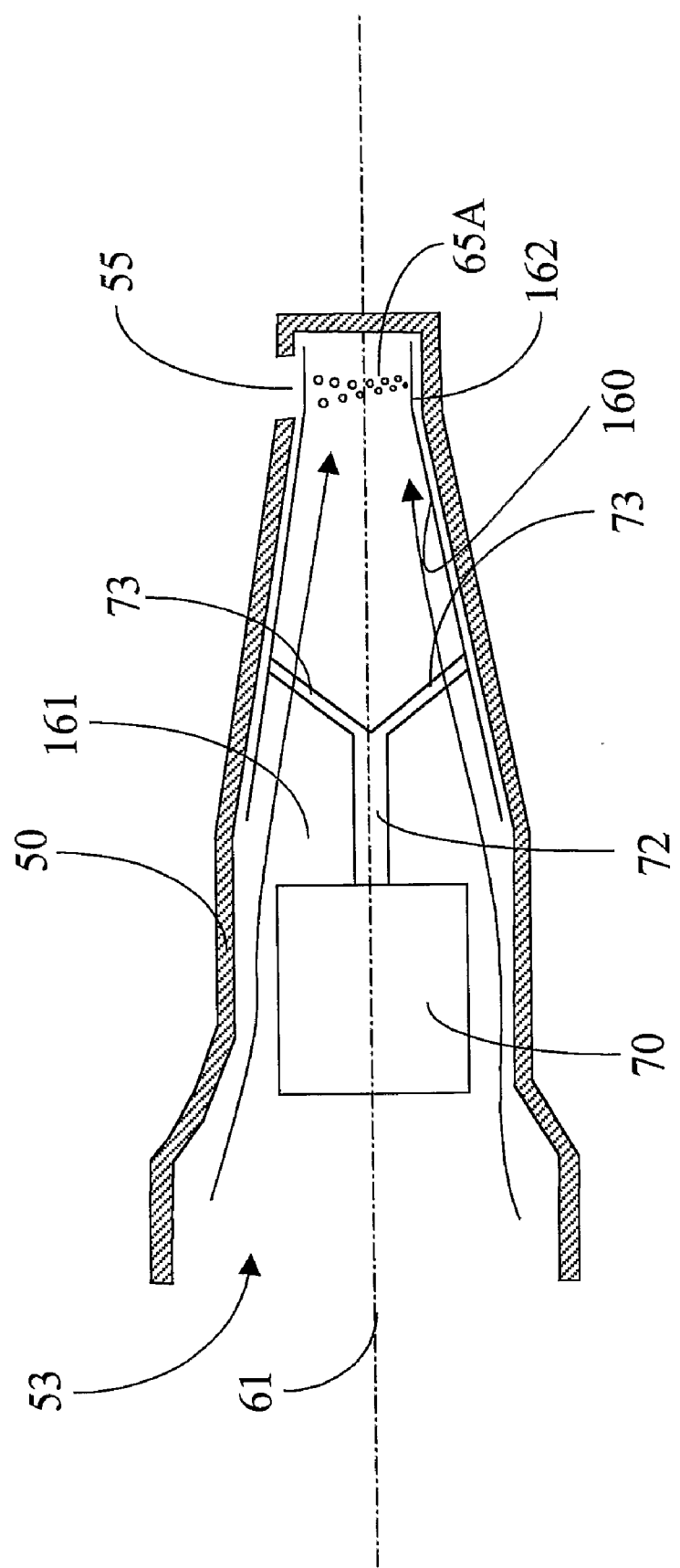
FIG. 6 shows a third embodiment of a throttle valve for use in the machine of FIG. 1.

FIG. 6 shows a further embodiment of the invention. In FIG. 6 the duct 160 has a conical shape, with a wide mouth 161 at the upstream end and a narrower, cylindrical section 162 at the downstream end. The downstream end 162 and outlet 65A operate in the same manner as described above. This alternative form of inlet has the effect of funnelling airflow towards the section 162. The mouth 161 provides an easy path for airflow into the interior of the duct 160 and thus there is no need for any holes or slots (62, 62A) in the wall of the duct 160. As in the other embodiments, duct 160 is rotatable about its longitudinal axis 61. A motor 70 has a drive shaft 72 which is aligned with the longitudinal axis 61. A set of arms forming a coupling device 73 connect the drive shaft 72 to the duct 160. There can be two, preferably three or more arms 73. Air can freely flow between the set of arms into the interior of duct 160. It can be seen that this embodiment is more complex to manufacture compared to a cylindrical tube 60 shown in the previous embodiments.

As described above, the entire motor 70, drive shaft 72, coupling device 73, 74, and duct 60, 160 are mounted in the air flow path between the air reservoir 5 and outlet 55 of the housing 50. This has the advantage that a flow of air through the valve cools these parts and prevents overheating. It also means that no seal is required between the moving valve member, more particularly duct 60, 160 and the external atmosphere.

According to an alternative (not shown) the air flow can also flow through the motor 70 itself instead of around the motor 70 as shown in FIGS. 2, 3 and 6. To this end, the drive shaft 72 of the motor 70 may be made of a hollow shaft or the motor 70 may contain channels to allow the flow of air to pass along the motor 70.

It is necessary to provide power and a control signal to the motor 70 via a control cable 40 and a connector 41. This control cable 40 can be fitted through a borehole in the wall of the housing 50. The borehole should be sealed against air escape, such as by a fluid-tight seal. The sealing requirements are simple since the control cable 40 is arranged stationary. This control cable 40 can according to an alternative embodiment be fitted through a borehole (not shown) in the wall of the reservoir 5.

Friction between the duct 60 and the portion of the housing 50 in the region of the outlet 65 can be minimised by a copper or polymer bearing ring 58 in which the duct 60 will rotate. The bearing ring 58 comprises an opening 59 arranged mainly in the prolongation of the opening 55 of the housing 50. Even if friction occurs, the heat generated due to this friction will be taken up by the airflow passing through the throttle valve 13a, 13b. Although it is not expected that the throttle valve 13a, 13b will unduly increase temperature, warm air has been found to have a beneficial effect of aiding weft insertion. It is possible that an airflow can flow between the bearing ring 58 and the duct 60. This airflow will not be disadvantageous because normally this airflow will be small with respect to the airflow through the outlet 65 of the duct 60 and will not or only slowly change in time.

The position of the duct 60 of the throttle valve 13a, 13b is determined by motor 70. Motor 70 can be a stepper motor with a suitable number of steps to permit a required degree of control of the airflow rate. Alternatively the motor 70 can be a servomotor, e.g. a DC servomotor. Feedback of the angular position of duct 60 can be provided from an encoder attached to the duct or to the drive shaft 72 of the motor 70, e.g. an optical encoder (not shown). It is also possible to use an air flow sensor at the valve outlet 88 or at the outlet 55 of the housing 50 to generate a feedback signal for the air flow. It is also possible to use a pressure sensor at the outlet 88 or at the outlet 55 of the housing 50.

An embodiment has been operated with a stepper motor having a total of 80 steps, with 20 steps for high airflow and 60 steps for low airflow. A controller 20 is programmed with the relationship between, on the one hand, the angular position of the drive shaft 72 or the timing of the insertion cycle, and hence angular position of the duct 60, 160, and, on the other hand, the flow rate that this achieves. The position of the throttle valve 13a, 13b is operated in coordination with the main controller 20 for the air jet loom to set the air flow to a desired rate at a desired time. A control function 22 for the motor 70, e.g. the different motors 70 of the throttle valves 13a, 13b, can form part of the overall controller 20 of the machine. The control function 22 can receive an input indicative of the required airflow rate, e.g. from the set of instructions 21 for the current textile design, and outputs a control signal which causes the at least one motor 70 at a particular throttle valve 13a, 13b to move into an angular position which will cause the valve to achieve the desired flow rate. The control function 22 may alternatively reside locally with each motor 70. In this case, the control signal applied to each motor controller will indicate the required flow rate. Of course, the control of the motors 70 can also occur in dependence of signals of a weft detector 6, in other words as a function of the arrival of the respective weft thread 8a, 8b, 8c at the weft detector 6.

Consider an example weaving operation, which uses three different yarns 8a, 8b and 8c, further named A, B and C, each requiring a different airflow rate. With a yarn insertion sequence of ABCABC the throttle valve will normally be operated for each insertion. With a weaving rate of 1200 insertions per minute, it is necessary to operate the throttle valve twenty times every second, i.e. each 50 msec. As is known, in each weaving cycle the insertion time interval is substantially half of the time interval available for one weaving cycle, i.e. the time interval for one insertion and the time interval for beating up the inserted weft against the fell line. If one chooses for moving the duct 60 between two insertions, e.g. during the time interval for beating up, there is about 20 msec to bring the throttle valve in readiness for the next insertion. Even if one chooses to use the practically whole insertion cycle for moving the duct 60 there will only be available 50 msec for moving the duct 60. Of course other yarn insertion sequences can be used, depending on the desired pattern to be woven. With a yarn insertion sequence of AABBCC it is only necessary to change the throttle valve after every two insertions, as the same yarn, with almost the same properties, is inserted in two consecutive weaving machine cycles.

Referring again to FIG. 1, the throttle valve 13a, 13b, . . . , 13x can be positioned between an air tank or air reservoir 5 and a group of relay nozzles 4a, 4b, . . . , 4x or between a reservoir 5 and a main nozzle 2a, 2b, 2c, 2d, 2e, 2f. The shut-off valve 10a to 10f, 12a to 12x, 14 is not essential but is preferable. FIG. 1 shows each time a number of the relay nozzles 4a, 4b, . . . , 4x fed from the same throttle valve 13a, 13b, ..., 13x. Different relay nozzles 4a, 4b, ..., 4x along the loom may operate at a different airflow rate. For example, the last group of relay nozzles 4x may be controlled at a higher airflow than the ones at the beginning of the shed in order to hold the weft at the end of the insertion. The throttle valve according to the invention can be used to select whatever airflow rate is required. Any other function of airflow rates along the shed can be chosen with, for example, a high airflow for some of the relay nozzles and a lower airflow for some of the other relay nozzles. The use of the throttle valve allows to use one main reservoir 5 for all the relay nozzles and possibly also for all the main nozzles. In FIG. 1 each throttle valve supplies a group of three relay nozzles 4a, 4b, ..., 4x with air. According to an alternative, each relay nozzle or groups having two, four or more relay nozzles may be supplied with air via a same throttle valve.

The throttle valve according to the invention can also be used to optimise the airflow through each relay nozzle, which will lead to less airflow and less use of pressure air for the insertion. Using a throttle valve according to the invention an airflow reduction of up to 30% is possible. Another use of the throttle valve is to vary, e.g. increase or reduce the airflow during the insertion, such that for example a large airflow is generated as the weft passes the relay nozzle while a reduced airflow is generated when the weft is farther away from the relay nozzle. Another possibility is to vary the airflow cyclically during an insertion as known from U.S. Pat. No. 3,672,406.

If the throttle valve is used to provide airflow to a main insertion nozzle, it is desirable to set the throttle valve to a required throttle position before opening corresponding shut-off valve 11a to 11f. If the throttle valve is used to provide airflow to a relay nozzle, the throttle valve can preferably be set to a required throttle position before opening corresponding shut-off valve 12a to 12x. Further advantages can be gained by changing the throttle position while a weft thread 8a, 8b, 8c is being inserted.

The flow duct 60 that is movable with respect to the housing 50 or with respect to the flow path of the compressed fluid, is in the preferred embodiments shown in the drawings mounted rotatably within the housing 50. According to an alternative not shown the duct 60 is mounted movable in the direction of the longitudinal axis 61 such that a particular portion of the outlet of the duct 60 will be aligned with the outlet 55 of the housing 50 in order to regulate the fluid flow through the valve. In this embodiment the holes of the outlet 65A may be arranged longitudinally with respect to the duct 60, instead of circumferentially as shown in FIG. 5. According to a further alternative the duct 60 is movable with respect to the housing 50 both rotatable and longitudinally, for example such that the outlet of the duct 60 moves along a screw line and particular portions of the outlet of the duct 60 will be aligned with the outlet 55 of the housing 50 to regulate the fluid flow through the valve.

It is also possible that a throttle valve according to the invention is situated downstream of a shut off valve.

The invention is not limited to the embodiments described herein, which may be modified or varied without departing from the scope of the invention. It is possible to use throttle valves having the same construction or to use, for example, throttle valves having a different construction, more particularly throttle valves having a different construction for feeding an airflow to the main nozzles or to the relay nozzles or to the stretching nozzles.

The invention claimed is:

1. A valve comprising:
   a housing having a fluid inlet for receiving a flow of compressed fluid and a fluid outlet;
   a flow duct mounted movably with respect to the housing, the duct having a fluid inlet for receiving a flow of compressed fluid and a fluid outlet, the fluid outlet being positioned around at least a part of the circumference of the duct, the fluid outlet being dimensioned to provide a different flow rate at different sections around the circumference of the duct;
   the fluid outlet of the housing being alignable with a portion of the fluid outlet of the duct; and,
   a drive element for moving the duct with respect to the housing such that a desired portion of the fluid outlet of the duct aligns with the fluid outlet of the housing;
   wherein the fluid inlet of the duct is positioned around the circumference and in an end face of the duct at a position spaced along the duct from the fluid outlet.

2. The valve according to claim 1 wherein the valve comprises a flow duct mounted rotatably with respect to the housing, said drive element being arranged to rotate the duct with respect to the housing.

3. The valve according to claim 1 wherein the fluid inlet comprises a set of holes in a wall of the duct.

4. The valve according to claim 1 wherein the fluid outlet of the duct comprises a slot around a part of the circumference of the duct, the width of the slot, in a direction aligned with the longitudinal axis of the duct, varying around the circumference of the duct.

5. The valve according to claim 1 wherein the fluid outlet of the duct comprises a set of holes in the wall of the duct, the size of individual holes in the set differing around the circumference of the duct.

6. The valve according to claim 1 wherein the fluid outlet of the duct comprises a set of holes in the wall of the duct, the arrangement of the holes differing around the circumference of the duct.

7. The valve according to claim 1 wherein the drive element comprises a motor having a drive shaft and a coupling device which connects the drive shaft to the duct.

8. The valve according to claim 7 wherein the drive shaft is mounted coaxially with the longitudinal axis of the duct.

9. The valve according to claim 7 or 8 wherein the fluid inlet of the duct is in fluid communication with a fluid reservoir and the motor and coupling device are positioned within the fluid flow to the fluid inlet.

10. The valve according to claim 1 wherein the flow duct is substantially cylindrical.

11. The valve according to claim 1 wherein the duct is formed of a thin tubular wall.

12. The valve assembly comprising a first valve according to claim 1 and a shut-off valve in fluid communication with the outlet of the first valve.

13. The valve assembly according to claim 12 wherein the fluid inlet of the duct of the first valve is positioned around the circumference of the duct at a position spaced along the duct from the fluid outlet of the first valve.

14. The valve according to claim 4, wherein said slot is V-shaped.

* * * * *